US012761118B2

(12) United States Patent

Goya et al.

(10) Patent No.: US 12,761,118 B2

(45) Date of Patent: Oct. 13, 2026

(54) ABNORMALITY ESTIMATION SYSTEM, ABNORMALITY ESTIMATION METHOD, AND PROGRAM

(71) Applicant: KABUSHIKI KAISHA YASKAWA DENKI, Kitakyushu (JP)

(72) Inventors: Masahiro Goya, Kitakyushu (JP); Kohei Toyoda, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 585 days.

(21) Appl. No.: 18/048,656

(22) Filed: Oct. 21, 2022

(65) Prior Publication Data

US 2023/0137232 A1 May 4, 2023

(30) Foreign Application Priority Data

Oct. 28, 2021 (JP) ................................ 2021-176841

(51) Int. Cl.

*G01M 99/00* (2011.01)
*B23K 37/04* (2006.01)

(52) U.S. Cl.

CPC ....... *G01M 99/005* (2013.01); *B23K 37/0443* (2013.01)

(58) Field of Classification Search

CPC ........... G05B 2219/31455; G05B 2219/32187; G05B 2219/32188; G05B 2219/32193; G05B 19/4184; G05B 19/41875; B23K 11/11; B23K 11/252; B25J 9/1602; B25J 9/161; B25J 13/00

See application file for complete search history.

(56) References Cited

U.S. PATENT DOCUMENTS

| | | | | |
|---|---|---|---|---|
| 5,155,690 | A | 10/1992 | Nomaru et al. | |
| 2018/0056434 | A1* | 3/2018 | Aoki | B23K 11/255 |
| 2019/0369596 | A1* | 12/2019 | Kamiguchi | G05B 19/401 |
| 2021/0229283 | A1* | 7/2021 | Kobayashi | B25J 9/163 |

FOREIGN PATENT DOCUMENTS

| | | | |
|---|---|---|---|
| CN | 102205454 | A | 10/2011 |
| CN | 107765651 | A | 3/2018 |
| CN | 107866800 | A | 4/2018 |
| CN | 107921587 | A | 4/2018 |

(Continued)

OTHER PUBLICATIONS

Japanese Office Action issued on Mar. 28, 2023 in Japanese Patent Application No. 2021-176841 (with English translation), 8 pages.

(Continued)

*Primary Examiner* — Mohammad Ali
*Assistant Examiner* — Dhruvkumar Patel
(74) *Attorney, Agent, or Firm* — Oblon, McClelland, Maier & Neustadt, L.L.P.

(57) ABSTRACT

A system for estimating an abnormality includes an industrial device that controls one or more jigs such that the one or more jigs press an object to perform a work process, and processing circuitry that acquires operation data that is related to an operation of the industrial device and is measured at multiple time points after the object is pressed by the one or more jigs, and perform an estimation estimating an abnormality based on the operation data acquired.

20 Claims, 7 Drawing Sheets

(56) References Cited

FOREIGN PATENT DOCUMENTS

| | | | | | |
|---|---|---|---|---|---|
| JP | H01-233989 | A | | 9/1989 | |
| JP | 06-21700 | A | | 1/1994 | |
| JP | H0621700 | A | * | 1/1994 | |
| JP | H07-108674 | B2 | | 11/1995 | |
| JP | 08-112728 | A | | 5/1996 | |
| JP | 2003-80527 | A | | 3/2003 | |
| JP | 2013205894 | A | * | 10/2013 | |
| JP | 2020-27425 | | | 2/2020 | |
| JP | 2020157317 | A | * | 10/2020 | |
| JP | 6803633 | B1 | | 12/2020 | |
| WO | WO-2022085153 | A1 | * | 4/2022 | ............. B23K 11/24 |

OTHER PUBLICATIONS

Chinese Office Action Mar. 27, 2024 in corresponding Chinese Patent Application No. 202210948870.6 (with English translation), 19 pages.

* cited by examiner

ABNORMALITY ESTIMATION SYSTEM, ABNORMALITY ESTIMATION METHOD, AND PROGRAM

CROSS-REFERENCE TO RELATED APPLICATIONS

The present application is based upon and claims the benefit of priority to Japanese Patent Application No. 2021-176841, filed Oct. 28, 2021, the entire contents of which are incorporated herein by reference.

BACKGROUND OF THE INVENTION

Field of the Invention

The present disclosure relates to an abnormality estimation system, an abnormality estimation method, and a program.

Description of Background Art

Japanese Patent Publication No. H1-233989 describes that in a main body assembly process in which multiple assembly parts are assembled, for each locator of a workpiece positioning device, accuracy of a main body is detected based on a difference between a target advance position and an actual advance position of the each locator. Japanese Patent Publication No. H1-233989 also describes that a defect is detected by measuring a reaction force received by each locator during a period until the each locator reaches a final positioning position and when the each locator reaches the final positioning position.

Japanese Patent Publication No. H7-108674 describes that in a process in which an automobile body is assembled, a push-in force during body-side positioning is measured. Japanese Patent Publication No. H7-108674 also describes that when the push-in force is out of a predetermined range, a part having a defective assembly position is estimated by comparing a push-in force distribution pattern prepared for each defective positioning mode with an actually measured distribution pattern.

The entire contents of these publications are incorporated herein by reference.

SUMMARY OF THE INVENTION

According to one aspect of the present invention, a system for estimating an abnormality includes an industrial device that controls one or more jigs such that the one or more jigs press an object to perform a work process, and processing circuitry that acquires operation data that is related to an operation of the industrial device and is measured at multiple time points after the object is pressed by the one or more jigs, and perform an estimation estimating an abnormality based on the operation data acquired.

According to another aspect of the present invention, a method for estimating abnormality includes controlling a jig by an industrial device such that the jig presses an object to perform a work process, acquiring operation data that is related to an operation of the industrial device and is measured at multiple time points after the object is pressed by the jig, and estimating an abnormality based on the operation data.

According to yet another aspect of the present invention, a non-transitory computer-readable storage medium includes computer executable instructions that when executed by a computer, cause the computer to perform a method, and the method includes controlling a jig by an industrial device such that the jig presses an object to perform a work process, acquiring operation data that is related to an operation of the industrial device and is measured at multiple time points after the object is pressed by the jig, and estimating an abnormality based on the operation data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
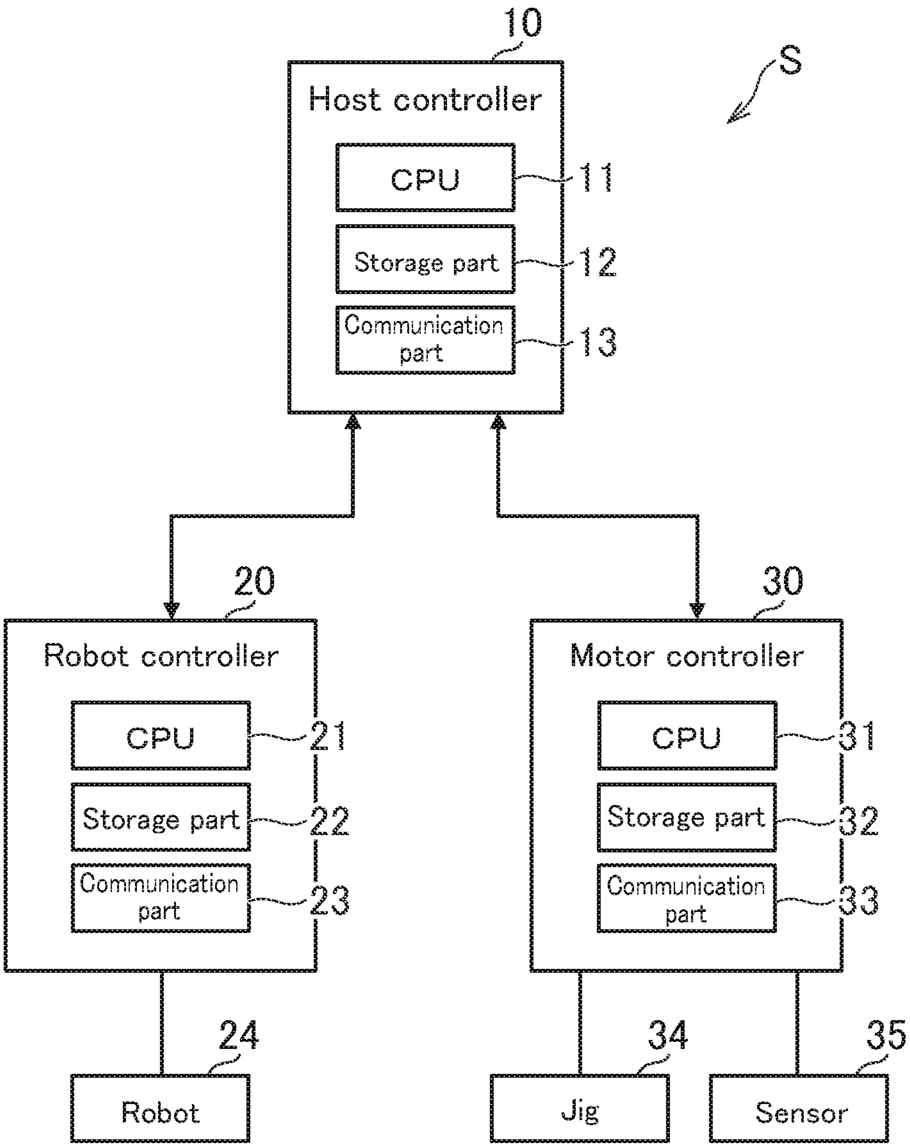
FIG. 1 illustrates an overall structure of an abnormality estimation system according to an embodiment of the present invention.

Embodiments will now be described with reference to the accompanying drawings, wherein like reference numerals designate corresponding or identical elements throughout the various drawings.

Overall Structure of Abnormality Estimation System

An example of an abnormality estimation system according to an embodiment of the present invention is described. FIG. 1 illustrates an example of an overall structure of the abnormality estimation system. For example, a host controller 10, a robot controller 20, and a motor controller 30 are connected to any network such as an industrial network. An abnormality estimation system (S) may include an industrial device to be described later, and devices included in the abnormality estimation system (S) are not limited to those in the example in FIG. 1.

The host controller 10 is a device that controls each of the robot controller 20 and the motor controller 30. For example, the host controller 10 is a PLC (Programmable Logic Controller), a controller that manages units called lines, or a controller that manages units called cells smaller than lines. A CPU 11 includes at least one processor. A storage part 12 includes at least one of a volatile memory and a non-volatile memory. A communication part 13 includes at least one of a communication interface for wired communication and a communication interface for wireless communication.

The robot controller 20 is a device that controls a robot 24. Physical structures of a CPU 21, a storage part 22, and a communication part 23 may be respectively the same as those of the CPU 11, the storage part 12, and the communication part 13. In the present embodiment, a case where the robot 24 is a welding robot is described. However, the robot 24 may be of any kind and is not limited to a welding robot. For example, the robot 24 may be a painting robot, a carrying robot, a picking robot, or an assembly robot.

The motor controller 30 is an example of an industrial device that controls a jig 34 for pressing an object as an object of a work. Therefore, a part described as the motor controller 30 can be read as an industrial device. The industrial device may be any device that can control the jig 34, and is not limited to the motor controller 30. For example, the industrial device may be a numerical control device, a machine controller, a PLC, a controller that manages lines, or a controller that manages the above-described cells. Physical structures of a CPU 31, a storage part 32, and a communication part 33 may be respectively the same as those of the CPU 11, the storage part 12, and the communication part 13.

The term "work" means an act performed with respect to an object. A welding work performed by the robot 24 of the present embodiment is also an example of a work. A work performed by the robot 24 may be any work and is not limited to a welding work. For example, processing other than a welding work, such as painting, cutting, or molding, may correspond to a work. For example, heat processing, assembling, inspecting, measuring, or carrying also may correspond to a work.

The term "object" means an object of a work. An object is also referred to as a workpiece. In the present embodiment, a case where a part to be welded corresponds to an object is described. However, an object may be any object and is not limited to a part to be welded. For example, an object may be a final product or a material for manufacturing a part. An object is not limited to an industrial product, but may be any object such as food or clothing.

The jig 34 includes a motor controlled by the motor controller 30. For example, the jig 34 includes a jig clamp (34A) that moves due to that a motor rotates, and a fixed-side member (34B) for fixing an object. In the present embodiment, a case where a welding jig using a ball screw corresponds to the jig 34 is described. However, as the jig 34, various jigs commonly known may be used. For example, the jig 34 may be a welding jig using a mechanism other than a ball screw. For example, the jig 34 may be a cutting jig, a bending jig, a press-fitting jig, a heat processing jig, a painting jig, an assembly jig, an inspection jig, or a measurement jig.

A sensor 35 is connected to the motor controller 30. As the sensor 35, any kind of sensor can be used. For example, a sensor such as a torque sensor, a motor encoder, a position sensor, an angle sensor, a vision sensor, a motion sensor, an infrared sensor, an ultrasonic sensor, or a temperature sensor may be connected. Any of these sensors may also be connected to the host controller 10 or the robot controller 20. For example, the sensor 35 detects a state of the jig 34 or an object. In the present embodiment, a case where the sensor 35 includes a torque sensor and a position sensor and torque data and position data are acquired is described.

A program or data stored in each device may also be supplied via a network. Further, the physical structures of the devices are not limited to those in the above example, and various kinds of hardware can be applied. For example, a reading part (for example, a memory card slot) that reads a computer-readable information storage medium or an input-output part (for example, a USB terminal) for connecting to an external device may be included. In this case, a program or data stored in the information storage medium may be supplied via the reading part or the input-output part. For example, other circuits such as an FPGA or an ASIC may be included in each device. In the present embodiment, a case where CPUs (11, 21, 31) each correspond to a structure called a circuitry is described. However, other circuits such as an FPGA or an ASIC may also correspond to a circuitry.

Overview of Abnormality Estimation System

Figure 2:
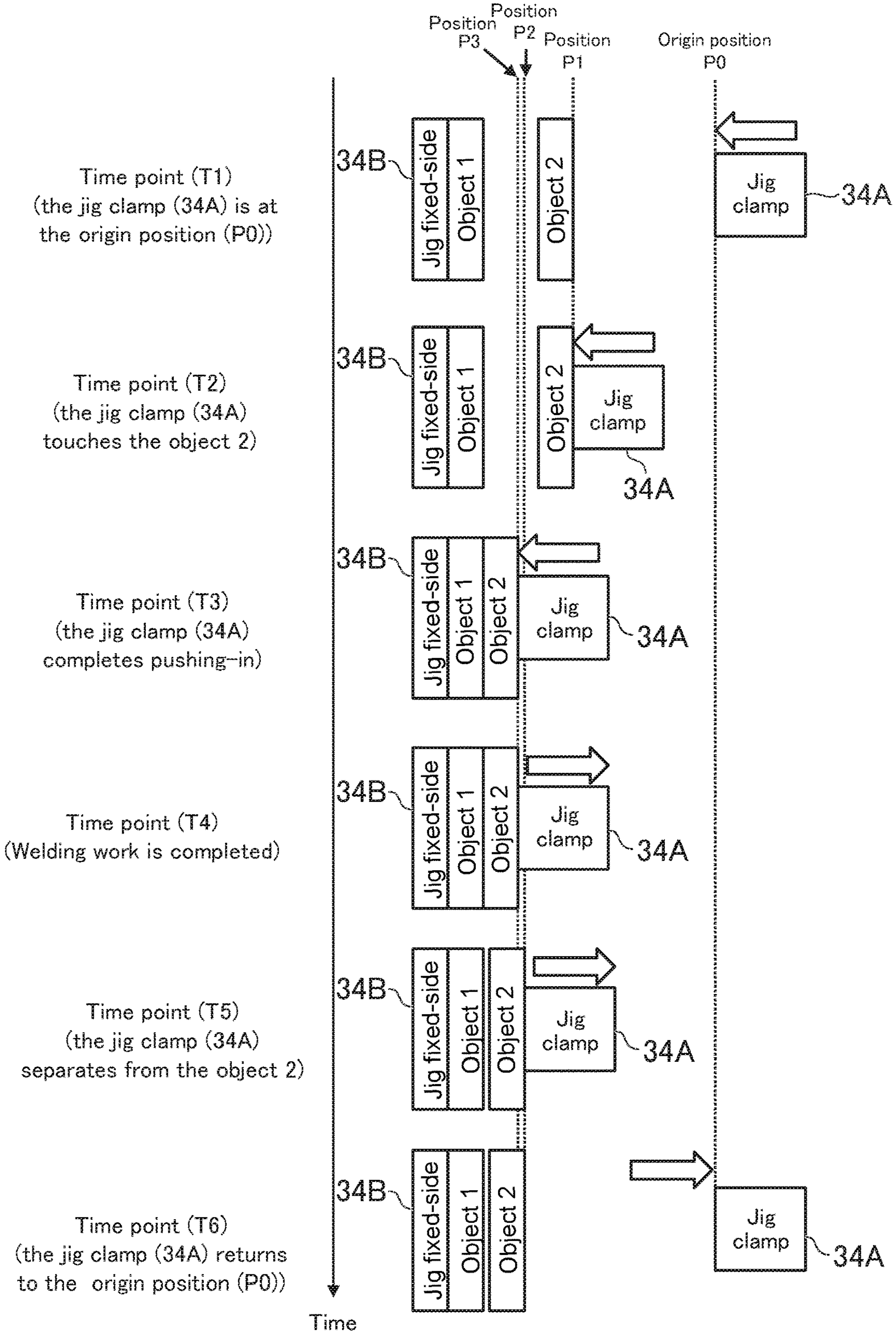
FIG. 2 illustrates an example of how an object is pressed by a jig.

FIG. 2 illustrates an example of how an object is pressed by the jig 34. A downward arrow in FIG. 2 is a time axis. For example, the jig 34 includes the jig clamp (34A) and the fixed side member (34B). In the example of FIG. 2, a welding work is performed to join an object 1 and an object 2. The object 1 is fixed in advance to the fixed-side member (34B) of the jig 34. The welding work is performed is a state in which the object 2 is pressed against the object 1 by the jig clamp (34A).

In the present embodiment, the welding work is periodically performed. When a welding work with respect to a certain object 1 and a certain object 2 is completed, a welding work with respect to a next object 1 and a next object 2 is performed. FIG. 2 illustrates how a welding work is performed in a certain cycle. For example, at a time point (T1) immediately after a start of a certain cycle, the jig clamp (34A) is at an origin position (P0). The origin position (P0) is an initial position of the jig clamp (34A). An object 1 and an object 2 are positioned between the jig clamp (34A), which is at the origin position (P0), and the fixed-side member (34B). At the time point (T1), the object 2 is not touching the jig clamp (34A). In FIG. 2, there is a space between the object 1 and the object 2 at the time point (T1). However, it is also possible that the object 1 and the object 2 are touching each other at the time point (T1).

The term "position" in the present embodiment means a position of the object 2 in a push-in direction. In the example of FIG. 2, since the object 2 is pushed in a lateral direction, a position in the lateral direction corresponds to the position in the present embodiment. That is, a position in a movement direction of the jig clamp (34A) corresponds to the position in the present embodiment. For example, a position is expressed by coordinates with reference to the origin position (P0). It may be two-dimensional or three-dimensional information instead of one-dimensional information as in the present embodiment. That is, it may be a two-dimensional position in a plane, or a three-dimensional position in space.

For example, the host controller 10 transmits a movement command to the motor controller 30 to start a movement of the jig clamp (34A). Upon receiving the movement command, the motor controller 30 controls the jig 34 such that the jig clamp (34A) starts moving toward the object 2. The jig clamp (34A) starts moving from the origin position (P0) and gradually approaches the object 2. When the jig clamp (34A) touches the object 2 at a position (P1) (at a time point (T2) in FIG. 2), the pushing-in of the object 2 starts.

The jig clamp (34A) pushes in the object 2 while touching the object 2. The object 2 is pushed in by the jig clamp (34A) and gradually approaches the object 1. When the object 2 touches the object 1, the object 1 and the object 2 are further pushed in so as to be firmly fixed to each other. When the pushing-in of the object 2 is completed (at a time point (T3) in FIG. 2), the motor controller 30 transmits a fixing completion notification to the host controller 10 indicating that the fixing of the object 2 is completed. In FIG. 2, a position at which the fixing of the object 2 is completed is a position (P3).

Upon receiving the fixing completion notification from the motor controller 30, the host controller 10 transmits a work start command to the robot controller 20 to start a welding work. Upon receiving the work start command, the robot controller 20 controls the robot 24 such that a welding work for the object 1 and the object 2 is started. When the welding work is completed, the robot controller 20 transmits a work completion notification to the host controller 10 indicating that the welding work has been completed.

Upon receiving the work completion notification, the host controller 10 transmits a movement command to the motor controller 30 for starting a movement in a direction away from the object 2 (that is, a direction returning to the origin position (P0)). When the welding work is completed and the movement command is received, the motor controller 30 controls the jig 34 such that the jig clamp (34A) starts a movement in a direction away from the object 2 (at a time point (T4) in FIG. 2). Since the object 2 is pressed with a certain force, even when the jig clamp (34A) starts to move, the jig clamp (34A) does not immediately separates from the object 2.

When the jig clamp (34A) continues to move in the direction away from the object 2, the jig clamp (34A) separates from the object 2 at a position (P2) (at a time point (T5) in FIG. 2). A difference between the position (P1) and the position (P2) is an expansion width when the force pressing the welded object 1 and object 2 is lost. Although In FIG. 2, a space is provided between the object 1 and the object 2 at the time point (T5), since the object 1 and the object 2 are joined by the welding work, it is assumed that there is actually no space between the object 1 and the object 2. The jig clamp (34A) continues to move in the direction away from the object 2 and stops when it reaches the origin position (P0) (at a time point (T6) in FIG. 2).

In the present embodiment, the welding work with respect to the object 1 and the object 2 is performed according to the flow of FIG. 2. For example, when any abnormality occurs during, or before or after, the welding work, some features may appear in torque data or position data. For example, when a surface of the object 2 before the welding work has unevenness that does not allow the object 2 to be properly joined with the object 1, the position (P1) at which the jig clamp (34A) touches the object 2 may be different from a normal position. For example, when the object 2 expands excessively during the welding work, the position (P2) at which the jig clamp (34A) separates from the object 2 may be different from a normal position. Therefore, the abnormality estimation system (S) of the present embodiment estimates an abnormality based on torque data and position data acquired during a period of FIG. 2. In the following, details of the abnormality estimation system (S) are described.

Functions Realized by Abnormality Estimation System

Figure 3:
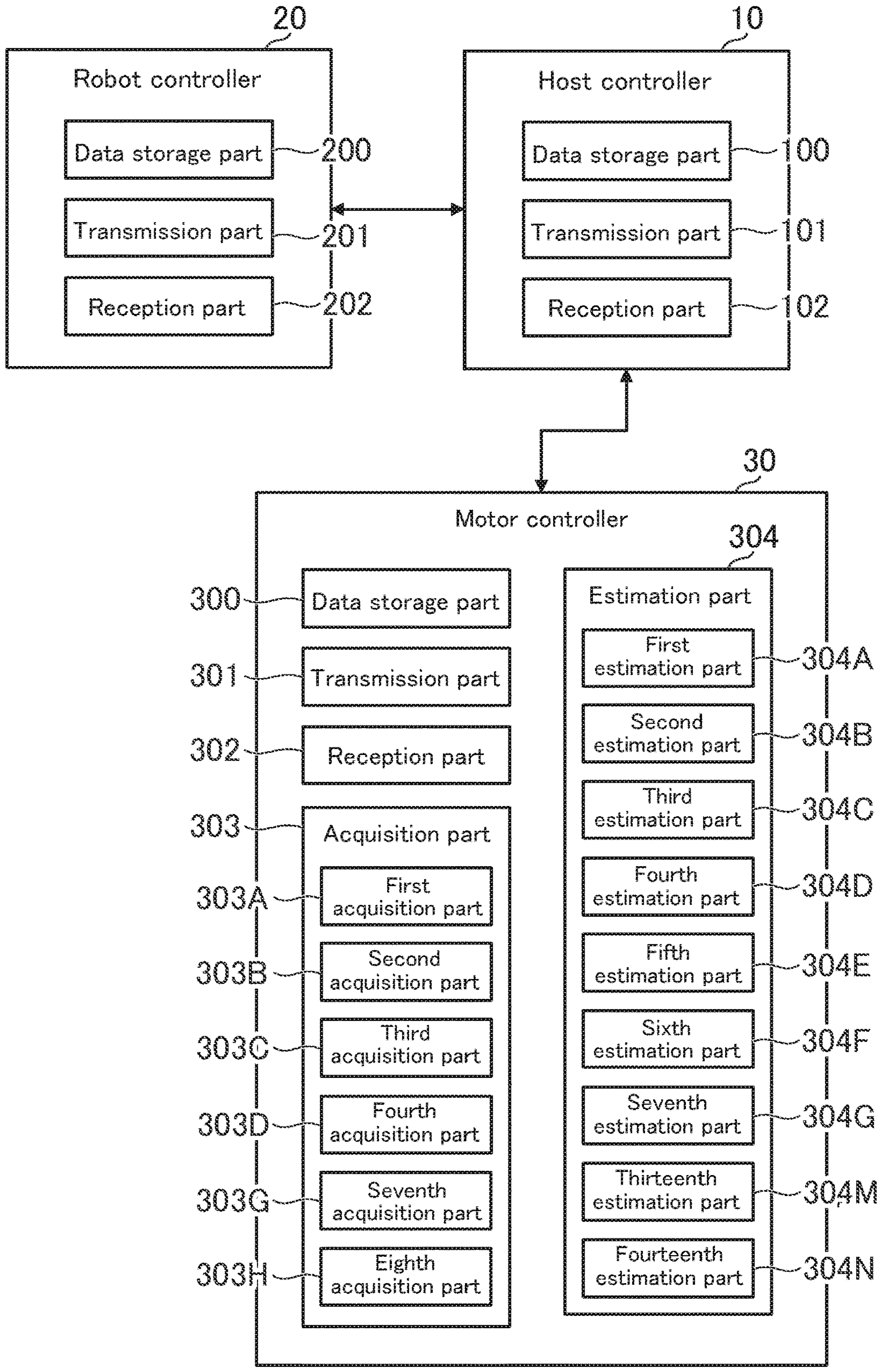
FIG. 3 is a functional block diagram illustrating an example of functions realized by an abnormality estimation system according to an embodiment of the present invention.

FIG. 3 is a functional block diagram illustrating an example of functions realized by the abnormality estimation system (S).

Functions Realized by Host Controller

A data storage part 100 is mainly realized by the storage part 12. A transmission part 101 and a reception part 102 are mainly realized by the CPU 11.

Data Storage Part

The data storage part 100 stores data required for controlling the robot controller 20 and the motor controller 30. For example, the data storage part 100 stores a control program for controlling the robot controller 20 and parameters referenced by this control program. The control program can be written in any language, for example, the robot language or the ladder language. This point also applies to other control programs. The control program for controlling the robot controller 20 includes a process of transmitting a command to the robot controller 20. For example, a control program for controlling the motor controller 30 and parameters referenced by this control program are stored. This control program includes a process of transmitting a command to the motor controller 30.

Transmission Part

The transmission part 101 transmits a command to the robot controller 20 to perform a predetermined operation based on the control program and parameters for controlling the robot controller 20. The work start command described above is an example of a command transmitted by transmission part 101. A command transmitted by the transmission part 101 may be any command, and may be, for example, a command to move the robot 24 to a predetermined position, a command to call a predetermined job, a command to start the robot controller 20, a command requesting trace data, or a command to set a parameter. The point that a command of the present embodiment may be any command also applies to other commands. The transmission part 101 transmits a command to the motor controller 30 to perform a predetermined operation based on the control program and parameters for controlling the motor controller 30. The movement command described above is an example of a command transmitted by transmission part 101.

Reception Part

The reception part 102 receives a response corresponding to a command from each of the robot controller 20 and the motor controller 30. The response includes an execution result of the command. The response may include any data, for example, operation data to be described later. For example, when the transmission part 101 receives a response from the robot controller 20, the transmission part 101 transmits a next command to the robot controller 20. The next command is included in the control program for controlling the robot controller 20. For example, when the transmission part 101 receives a response from the motor controller 30, the transmission part 101 transmits a next command to the motor controller 30. The next command is included in the control program for controlling the motor controller 30. The fixing completion notification and the work completion notification described above are each an example of a response received by the reception part 102

Functions Realized by Robot Controller

A data storage part 200 is mainly realized by the storage part 22. A transmission part 201 and a reception part 202 are mainly realized by the CPU 21.

Data Storage Part

The data storage part 200 stores data required for controlling the robot 24. For example, the data storage part 200 stores a robot control program for controlling the robot 24 and robot parameters referenced by the robot control program. In the present embodiment, since a welding work is performed by the robot 24, the robot control program includes a process indicating procedures of a welding work performed by the robot 24. The robot parameters indicate a target position of the robot 24 and an output or time in a welding work. The data storage part 200 may store the robot control program and the robot parameters according to a work performed by the robot 24.

Transmission Part

The transmission part 201 transmits to the host controller 10 a response corresponding to a command from the host controller 10. For example, the transmission part 201 transmits a work completion notification to the host controller 10 as a response when a work indicated by a work start command received from the host controller 10 is completed.

Reception Part

The reception part 202 receives a command regarding an operation of the robot controller 20 from the host controller 10. For example, the reception part 202 receives a work start command from the host controller 10.

Functions Realized by Motor Controller

A data storage part 300 is mainly realized by the storage part 32. A transmission part 301, a reception part 302, an acquisition part 303, and an estimation part 304 are mainly realized by the CPU 31.

Data Storage Part

The data storage part 300 stores data required for controlling the jig 34. For example, the data storage part 300 stores a jig control program for controlling the jig 34 and jig parameters referenced by the jig control program. In the present embodiment, since the jig clamp (34A) moves in a direction toward the fixed-side member (34B), the jig control program includes a process indicating procedures for moving the jig clamp (34A). Controlling of the jig 34 is not limited to a movement, and may be any controlling related to an operation of the jig 34. For example, when the jig 34 needs to be tightened in order to fix the object 2, tightening the jig 34 may correspond to the controlling. For example, when the jig needs to pass a member through a hole for fixing the object 2, passing the member through the hole may correspond to the controlling. The jig parameters indicate a moving speed of the jig clamp (34A) and a pressing force of the jig clamp (34A). The data storage part 300 may store the jig control program and the jig parameters according to a type of the jig 34.

Transmission Part

The transmission part 301 transmits to the host controller 10 a response corresponding to a command from the host controller 10. For example, the transmission part 301 transmits a fixing completion notification or a movement completion notification to the host controller 10 as a response when a movement indicated by a movement command received from the host controller 10 is completed.

Reception Part

The reception part 302 receives a command regarding an operation of the robot controller 20 from the host controller 10. For example, the reception part 302 receives a movement command from the host controller 10.

Acquisition Part

The acquisition part 303 acquires operation data related to an operation of the motor controller 30 measured at each of multiple time points after the object 2 is pressed by the jig 34.

That the object 2 is pressed by the jig 34 means that a force is applied to the object 2 by the jig 34 that touches the object 2. Since some force is applied to the object 2 even at the moment when the jig 34 touches the object 2, touching the object 2 by the jig 34 also corresponds to pressing the object 2 by the jig 34. A time point after the object 2 is pressed by the jig 34 is a time point when the object 2 is pressed by the jig 34 or a time point after this time point. In the example of FIG. 2, the time point (T2) is an example of a time point after the object 2 is pressed by the jig 34. A time point after the time point (T2) (for example, each of the time points (T3-T6)) also corresponds to a time point after the object 2 is pressed by the jig 34.

Multiple time points after the object 2 is pressed by the jig 34 are two or more time points different from each other after the object 2 is pressed by the jig 34. The multiple time points may include the time point (T2) when the jig 34 touches the object 2 (that is, the moment when the jig 34 touches the object 2). For example, the multiple time points include the time point (T2) when the jig 34 touches the object 2 and time points after the time point (T2). For example, the multiple time points may be two or more time points after the time point when the jig 34 touches the object 2, excluding the time point (T2) when the jig 34 touches the object 2. For example, the multiple time points may be multiple time points during a welding work, or may be multiple time points between completion of a welding work and the time point (T5) when the jig 34 separates from the object 2.

The operation data may be any data related to an operation of the motor controller 30. For example, the operation data includes at least one of data detected by the sensor 35 and data that indicate internal processing of the motor controller 30. In the present embodiment, a case where torque data detected by the torque sensor included in the sensor 35 and position data detected by the position sensor included in the sensor 35 correspond to the operation data is described.

Figure 4:
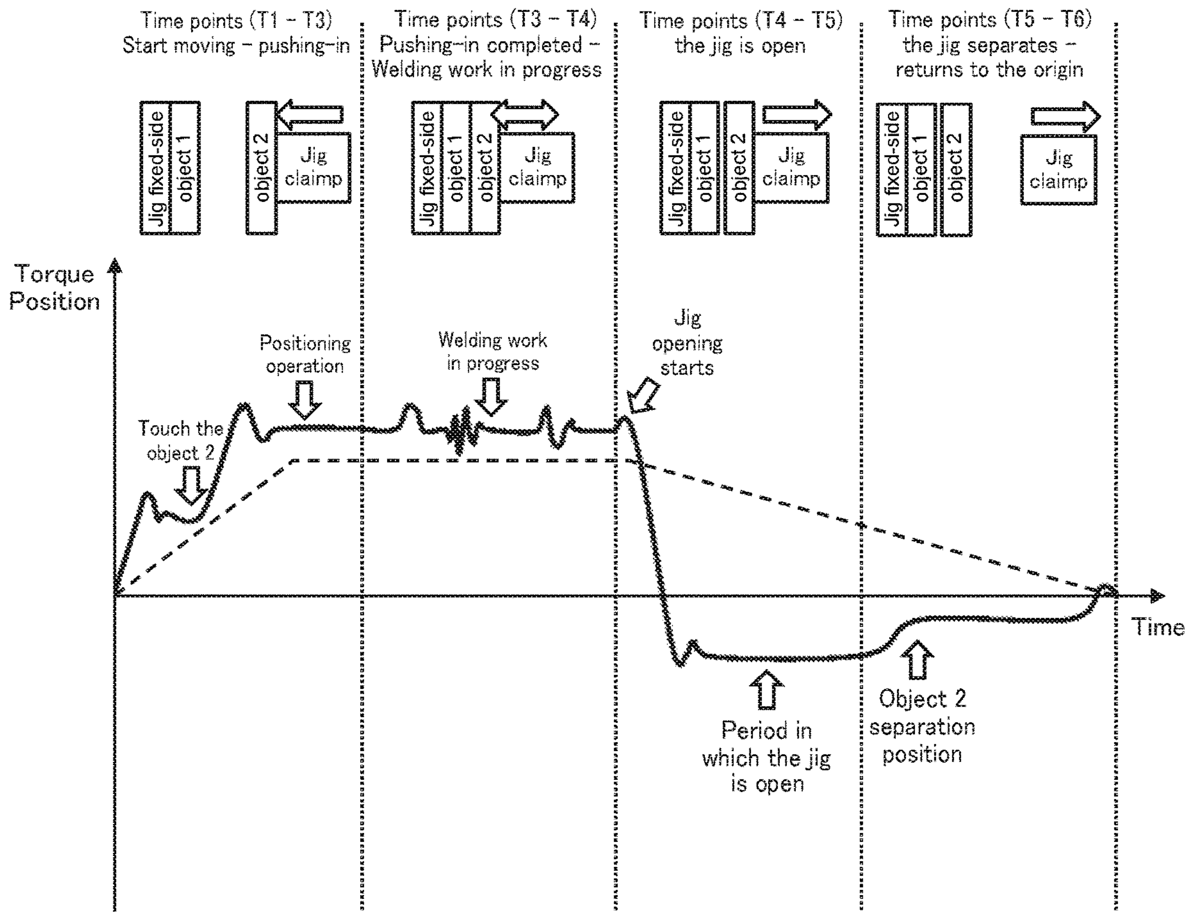
FIG. 4 illustrates an example of operation data according to an embodiment of the present invention.

FIG. 4 illustrates an example of the operation data. The solid line in FIG. 4 is the torque data. The broken line in FIG. 4 is the position data. The torque data and the position data are assumed to have the same time stamp. As illustrated in FIG. 4, the operation data may include time points before the jig clamp (34A) touches the object 2. For example, the acquisition part 303 starts acquiring torque values when a certain cycle starts, and continues to acquire torque values until an end of this cycle. The acquisition part 303 acquires torque values from a start time point to an end time point of a certain cycle as the operation data. The operation data shows a time-series change in torque value during a period in which the operation data is acquired. The torque values may be normalized.

The position data shows a time series change in position of the jig clamp (34A) (for example, a surface where the jig clamp (34A) touches the object 2). The position data is acquired based on a detection signal of the position sensor included in the sensor 35. For example, the position data may be acquired based on a motor rotation amount detected by a motor encoder. For example, the position data may be acquired based on a movement amount detected by a motion sensor. For example, the position data may be acquired by analyzing an image acquired by a vision sensor. The operation data may be any data and is not limited to the torque data and the position data. For example, the operation data may be a rotation direction of a motor, a speed of a motor, an angle of a motor, or a pressing pressure against the object 2 by the jig clamp (34A).

For example, THE acquisition part 303 includes a first acquisition part (303A), a second acquisition part (303B), a third acquisition part (303C), a fourth acquisition part (303D), a seventh acquisition part (303G), and ab eighth acquisition part (303H). A fifth acquisition part (303E) and a sixth acquisition part (303F) are described in modified embodiments to be described later. The acquisition part 303 may include only one of the first acquisition part (303A)—the eighth acquisition part (303H) or any combination of the first acquisition part (303A)—the eighth acquisition part (303H). It is also possible that the acquisition part 303 does not include any of the first acquisition part (303A)—the eighth acquisition part (303H).

The first acquisition part (303A) acquires the operation data measured at the time point (T5) when the jig 34 separates from the object 2. The time point (T5) is a time point when the jig 34 changes from a state of touching the object 2 to a state of not touching the object 2. For example, the first acquisition part (303A) acquires a measurement result at the time point (T5) from the operation data measured in a certain period. When the jig 34 separates from the object 2, the torque value may show a certain feature. Therefore, the first acquisition part (303A) estimates a time point when the operation data shows this feature as the time point (T5). The first acquisition part (303A) acquires a measurement result at the estimated time point (T5). The first acquisition part (303A) may acquire a measurement result in a period including the time point (T5).

For example, as illustrated in FIG. 4, when an increase in torque value, from a state in which the torque value is low and there is no change in torque value or the change is small, is equal to or larger than a threshold, the first acquisition part (303A) estimates this time point as the time point (T5) when the jig 34 separates from the object 2. The first acquisition part (303A) acquires the torque value at the estimated time point (T5) from the operation data. A method for estimating the time point (T5) is not limited to the above example, and may be any method. For example, the first acquisition part (303A) may estimate, as the time point (T5), a time point after a predetermined time from the start of the acquisition of the operation data. In addition, for example, the first acquisition part (303A) may estimate, as the time point (T5), a time point after a predetermined time after a notification that a welding work has been completed is received from the host controller 10.

The second acquisition part (303B) acquires operation data including measurement results at a first time point when a first event occurs and at second time point when a second event occurs. The first event and the second event are events that are important elements for abnormality estimation. In the present embodiment, a case is described where the first event is that the jig 34 touches the object 2 and the second event is that the jig 34 separates from the object 2. Therefore, in the present embodiment, the processing of the second acquisition part (303B) is the same as the processing of the third acquisition part (303C) described below.

The third acquisition part (303C) acquires operation data including measurement results at the time point (T2) when the first event that the jig 34 touches the object 2 occurs and at the time point (T5) when the second event that the jig 34 separates from the object 2 occurs. The time point (T2) is an example of a first time point, and the time point (T5) is an example of a second time point. Therefore, a part described as the time point (T2) can be read as the first time point, and a part described as the time point (T5) can be read as the second time point.

For example, the third acquisition part (303C) acquires a measurement result at the time point (T2) and a measurement result at the time point (T5) from operation data measured in a certain period. When the jig 34 touches the object 2, the torque value may show a specific first feature, and when the jig 34 separates from the object 2, the torque value may show a specific second feature. Therefore, the third acquisition part (303C) estimates, as the time point (T2), a time point when the operation data shows the first feature, and estimates, as the time point (T5), a time point when the operation data shows the second feature. The third acquisition part (303C) respectively acquires measurement results at the estimated time point (T2) and time point (T5). The third acquisition part (303C) may acquire a measurement result in a period including the time point (T2) and the time point (T5). Since a method for estimating the time point (T5) is as described in the processing of the second acquisition part (303B), a method for estimating the time point (T2) is described here.

For example, as illustrated in FIG. 4, when an increase in torque value, from a state in which the torque value is at a certain level and there is no change in torque value or the change is small, is equal to or larger than a threshold, the third acquisition part (303C) estimates this time point as the time point (T2) when the jig 34 touches the object 2. The third acquisition part (303C) acquires the torque value at the estimated time point (T2) from the operation data. A method for estimating the time point (T2) is not limited to the above example, and may be any method. For example, the third acquisition part (303C) may estimate, as the time point (T2), a time point after a predetermined time from the start of the acquisition of the operation data. In addition, for example, the third acquisition part (303C) may estimate, as the time point (T2), a time point when the jig clamp (34A) has advanced a certain distance after the start of movement.

The first event and the second event are not limited to the examples in the present embodiment. For example, instead of that the jig 34 touches the object 2, the first event may be that the jig clamp (34A) starts moving, or that the jig clamp (34A) advances a predetermined distance from the origin position (P0). For example, the first event may be that the torque value is equal to or larger than a threshold after the jig 34 touches the object 2, or may be that there is no change in torque value or the change is small. For example, the first event may be that a welding work is started or may be that a welding work is completed. For example, the first event may be that the jig clamp (34A) starts to move after a welding work is completed.

For example, the second event may be an event that can occur after the first event. For example, instead of that the jig 34 separates from the object 2, the second event may be that the jig clamp (34A) advances a predetermined distance from the origin position (P0). For example, the second event may be that the jig 34 touches the object 2. For example, the second event may be that the torque value is equal to or larger than a threshold after the jig 34 touches the object 2, or may be that there is no change in torque value or the change is small. For example, the second event may be that a welding work is started or may be that a welding work is completed. For example, the second event may be that the jig clamp (34A) starts to move after a welding work is completed.

The fourth acquisition part (303D) acquires operation data indicating the position (P1) at which the jig 34 touches the object 2 and the position (P2) at which the jig 34 separates from the object 2. The position (P1) at which the jig 34 touches the object 2 may mean a position at the time point (T2) when the jig 34 touches the object 2, or may mean a position at a time point before or after the time point (T2). That is, the position (P1) at which the jig 34 touches the object 2 is not limited to a moment when the jig 34 touches the object 2, but may be a position at a time point slightly before or after that moment.

Similarly, the position (P2) at which the jig 34 separates from the object 2 may mean a position at the time point (T5) when the jig 34 separates from the object 2, or may mean a position at a time point before or after the time point (T5). That is, the position (P2) at which the jig 34 separates from the object 2 is not limited to a moment when the jig 34 separates from the object 2, but may be a position at a time point slightly before or after that moment. As described above, the term "position" means a position in the movement direction of the jig clamp (34A). A position may mean an absolute position on the Earth, or may mean a relative position with respect to a reference position such as the origin position (P0) of the jig clamp (34A).

For example, the fourth acquisition part (303D) acquires the position (P1) of the jig clamp (34A) at the time point (T2) and the position (P2) of the jig clamp (34A) at the time point (T5) among the position data detected by the sensor 35. Methods for identifying the time point (T2) and the time point (T5) are as described above. The position (P1) and the position (P2) are respectively values of the position data at the time point (T2) and the time point (T5). Therefore, in the present embodiment, the torque data is used to identify the time point (T2) and the time point (T5), and the position data is used to identify the position (P1) and the position (P2).

The seventh acquisition part (303G) acquires multiple kinds of operation data. For example, the seventh acquisition part (303G) acquires torque data and position data as multiple kinds of operation data. The seventh acquisition part (303G) may acquire operation data other than the torque data and the position data. For example, the seventh acquisition part (303G) may acquire operation data detected by the sensor 35 other than the torque sensor and the position sensor described above as the operation data, or may acquire operation data indicating internal processing of the motor controller 30 instead of the operation data detected by the sensor 35. The seventh acquisition part 303 may acquire three or more kinds of operation data.

The eighth acquisition part (303H) acquires torque-related torque data as operation data. The eighth acquisition part (303H) acquires torque data based on a detection result of the sensor 35 as a torque sensor. For example, the eighth acquisition part (303H) acquires torque data showing a time-series change in torque value.

Estimation Part

The estimation part 304 estimates an abnormality based on the operation data acquired by the acquisition part 303. The abnormality is an abnormality that can occur in the abnormality estimation system (S). To estimate an abnormality is to determine occurrence of an abnormality or is to calculate a score that indicates a suspicion of an abnormality. In the present embodiment, a case is described where an abnormality of the object 1 or the object 2 is estimated. However, an abnormality estimated by the estimation part 304 may be of any kind and is not limited to an abnormality of the object 1 or the object 2. For example, the estimation part 304 estimates an abnormality of the jig 34, an abnormality of the motor controller 30, an abnormality of the sensor 35, an abnormality of the robot controller 20, an abnormality of the robot 24, an abnormality of the host controller 10, abnormalities of other peripheral devices, or multiple abnormalities of these.

The estimation part 304 estimates an abnormality from operation data based on a predetermined estimation method. In the present embodiment, a method in which operation data as an abnormality estimation target is compared with normal data measured during a normal operation is described as an estimation method. However, various methods can be used as abnormality estimation methods. For example, an abnormality estimation method may be an analytical method for analyzing values included in operation data. In the analytical method, an abnormality is estimated by comparing a value included in operation data with a threshold or comparing an amount of change in a value included in operation data with a threshold. For example, when there is at least one time point when a value included in operation data or an amount of change thereof is equal to or larger than a threshold, or when there are a predetermined number or more of such time points, an abnormality is estimated.

In addition, for example, an abnormality estimation method may be a machine learning method using a learning model. In the case of a machine learning method, either supervised learning or unsupervised learning may be used. Various methods commonly known may be used for machine learning, for example, a convolutional neural network, a recursive neural network, or deep learning can be used. In a learning model, training data including a pair of operation data measured in the past and information indicating whether or not the operation data is abnormal, is learned. In the case of a convolutional neural network, operation data may be input as an image showing a waveform. For example, the estimation part 304 inputs the operation data acquired by the acquisition part 303 into a learned learning model. The learning model calculates a feature quantity based on the input operation data and outputs an abnormality estimation result based on the calculated feature quantity. The learning model may output a score (probability of an abnormality) indicating a suspicion of an abnormality, not presence or absence of an abnormality.

For example, the estimation part 304 includes a first estimation part (304A), a second estimation part (304B), a third estimation part (304C), a fourth estimation part (304D), a fifth estimation part (304E), a sixth estimation part (304F), a seventh estimation part (304G), a thirteenth estimation part (304M), and a fourteenth estimation part (304N). An eighth estimation part (304H)—a twelfth estimation part (304L) are described in a modified embodiment to be described later. The estimation part 304 may include only one of the first estimation part (304A)—the fourteenth estimation part (304N), or may include any combination of the first estimation part (304A)—the fourteenth estimation part (304N). The estimation part 304 may include any of the first estimation part (304A)—the fourteenth estimation part (304N)

The first estimation part (304A) estimates an abnormality based on the operation data acquired by the first acquisition part (303A). For example, the first estimation part (304A) estimates that there is no abnormality in a case where a deviation between operation data measured at the time point (T5) when the jig 34 separates from the object 2 and normal data showing a normal value at this time point (T5) is not equal to or larger than a threshold, and estimates that there is an abnormality in a case where this deviation is equal to or larger than the threshold. The first estimation part (304A) may estimate an abnormality by analyzing values included in the operation data acquired by the first acquisition part (303A) using an analytical method or by using a machine learning method, instead of using normal data.

The second estimation part (304B) estimates an abnormality based on the operation data acquired by the second acquisition part (303B). For example, the second estimation part (304B) estimates that there is no abnormality in a case where a deviation between operation data including results measured at a first time point when a first event occurs and at a second time point when a second event occurs and normal data showing normal values of measurement results at these time points is not equal to or larger than a threshold, and estimates that there is an abnormality in a case where this deviation is equal to or larger than the threshold. The second estimation part (304B) may estimate an abnormality by analyzing values included in the operation data acquired by the second acquisition part (303B) using an analytical method or by using a machine learning method, instead of using normal data.

The third estimation part (304C) estimates an abnormality based on the operation data acquired by the third acquisition part (303C). For example, the third estimation part (304C) estimates that there is no abnormality in a case where a deviation between operation data including results measured at the time point (T2) when the jig 34 touches the object 2 and at the time point (T5) when the jig 34 separates from the object 2 and normal data showing normal values of measurement results at these time points is not equal to or larger than a threshold, and estimates that there is an abnormality in a case where this deviation is equal to or larger than the threshold. The third estimation part (304C) may estimate an abnormality by analyzing values included in the operation data acquired by the third acquisition part (303C) using an analytical method or by using a machine learning method, instead of using normal data.

The fourth estimation part (304D) estimates an abnormality based on the operation data acquired by the fourth acquisition part (303D). For example, the fourth estimation part (304D) estimates that there is no abnormality in a case where a deviation between operation data indicating the position (P1) at which the jig 34 touches the object 2 and the position (P2) at which the jig 34 separates from the object 2 and normal data showing normal values of these positions is not equal to or larger than a threshold, and estimates that there is an abnormality in a case where this deviation is equal to or larger than the threshold. The fourth estimation part (304D) may estimate an abnormality by analyzing values included in the operation data acquired by the fourth acquisition part (303D) using an analytical method or by using a machine learning method, instead of using normal data.

The fifth estimation part (304E) estimates an abnormality based on normal data related to a normal operation of the motor controller 30. The normal data is stored in advance in the data storage part 300. The normal data may be operation data measured using an object for testing, or may be operation data for which no abnormality has been estimated in the past. In addition, for example, the normal data may be an average of multiple sets of past operation data. For example, the fifth estimation part (304E) estimates that there is no abnormality in a case where a deviation between the operation data acquired by the acquisition part 303 and normal data is not equal to or larger than a threshold, and estimates that there is an abnormality in a case where this deviation is equal to or larger than the threshold. The deviation can be calculated using any indicator. For example, the deviation may be a sum of differences in values at respective time points at each of which a deviation is calculated, or a sum using some weighting coefficient. In addition, for example, the deviation may be an average value of values at respective time points at each of which a deviation is calculated, or may be a weighted average using some weighting coefficient.

The sixth estimation part (304F) estimates an abnormality occurring in an object (for example, at least one of the object 1 and the object 2; hereinafter, when an object means at least one of these, the reference numeral symbol of the object is omitted) based on the operation data acquired by the acquisition part 303. In the present embodiment, a case is described where an abnormality occurring in an object is an abnormality related to a width of the object. Therefore, in the present embodiment, the processing of the sixth acquisition part (304F) is the same as the processing of the seventh acquisition part (304G) described below.

The seventh estimation part (304G) estimates an abnormality related to a width of an object as an abnormality that has occurred in the object. The width of the object is a width in the movement direction of the jig 34. The width is a distance from one end of the object to the other end corresponding to the one end. The other end is an end on the opposite side with respect to the one end. In the example of FIG. 2, a width of an object in a horizontal direction corresponds to the width of the object. The width can also be referred to as a thickness. For example, the seventh estimation part (304G) may estimate an abnormality in the width of the object before a welding work based on a difference between the position (P1) at which the jig 34 touches the object 2 and the position (P1) in a normal operation. For example, the seventh estimation part (304G) may estimate an abnormality in the width of the object after a welding work based on a difference between the position (P2) at which the jig 34 separates from the object 2 and the position (P2) in a normal operation.

The thirteenth estimation part (304M) estimates an abnormality based on the operation data acquired by the seventh acquisition part (303G). For example, the thirteenth estimation part (304M) estimates an abnormality based on the torque data and the position data. For example, the thirteenth estimation part (304M) estimates an abnormality based on the position (P1) and the position (P2) estimated based on the torque data and the position data. The thirteenth estimation part (304M) estimates that there is no abnormality in a case where a deviation between the position (P1) and position (P2) and the position (P1) and position (P2) in a normal operation is less than a threshold, and estimates that there is an abnormality in a case where this deviation is equal to or larger than the threshold.

The fourteenth estimation part (304N) estimates an abnormality based on the torque data acquired by the eighth acquisition part (303H). For example, the fourteenth estimation part (304N) estimates that there is no abnormality in a case where a deviation between a value indicated by the torque data and a normal value is less than a threshold, and estimates that there is an abnormality in a case where this deviation is equal to or larger than the threshold. In addition, for example, the fourteenth estimation part (304N) estimates that there is no abnormality in a case where a deviation between the time point (T2) and time point (T5) estimated based on the torque data and the time point (T2) and time point (T5) in a normal operation is less than a threshold, and estimates that there is an abnormality in a case where this deviation is equal to or larger than the threshold. The time point (T2) and the time point (T5) in this case may each indicate an elapsed time from a start time point of a certain cycle. There is an abnormality when a deviation from the time point (T2) when the jig clamp (34A) is to touch the object 2 in a normal operation is large. There is an abnormality when a deviation from the time point (T5) when the jig clamp (34A) is to separate from the object 2 in a normal operation is large.

Processing Executed by Abnormality Estimation System

Figure 5:
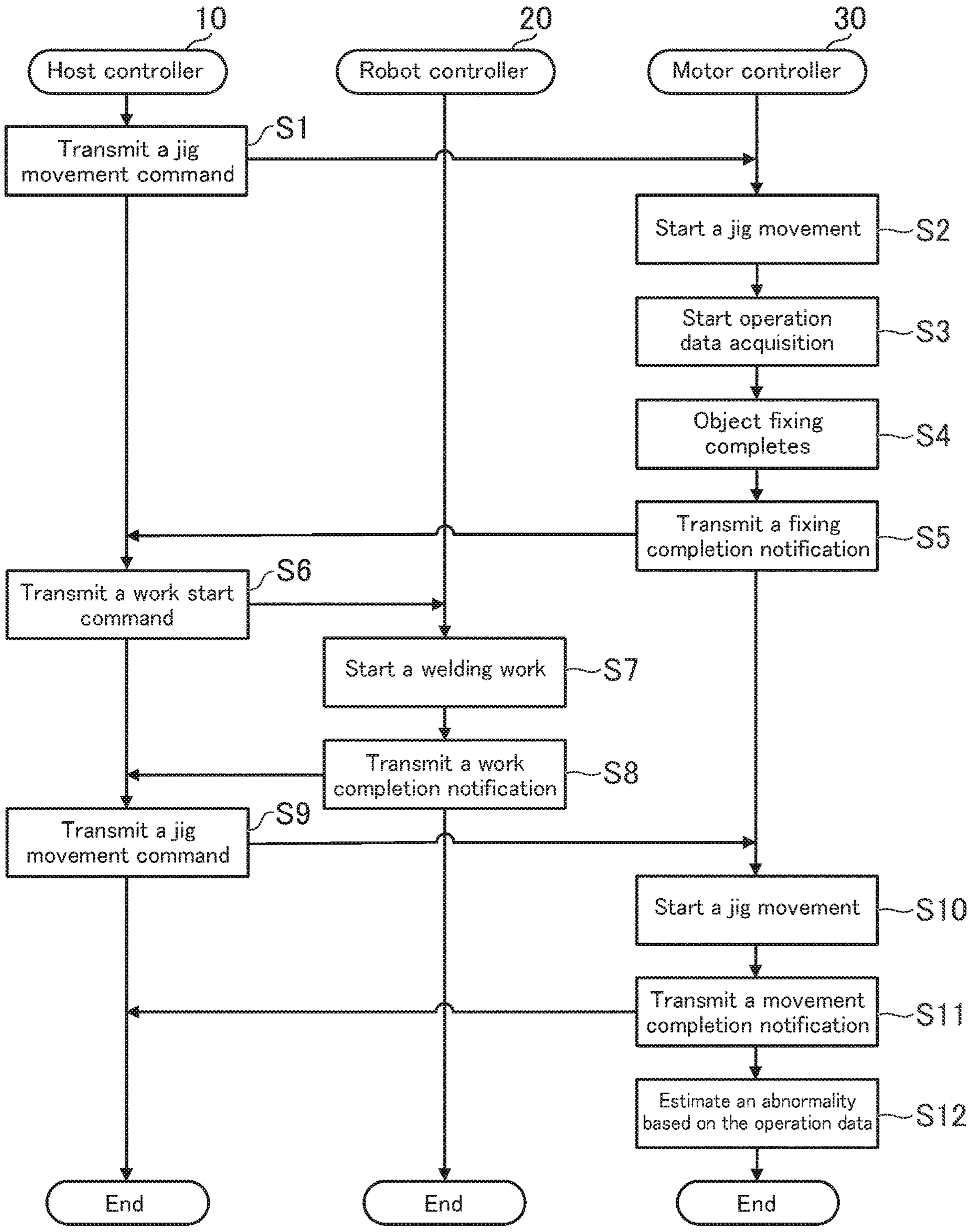
FIG. 5 illustrates an example of processing executed by an abnormality estimation system according to an embodiment of the present invention.

FIG. 5 illustrates an example of processing executed by the abnormality estimation system (S). The CPUs (11, 21, 31) execute the control programs stored in the storage parts (12, 22, 32), respectively, and thereby, the processing of FIG. 5 is executed. The processing of FIG. 5 is an example of the processing executed by the functional blocks of FIG. 3.

As illustrated in FIG. 5, the host controller 10 transmits a movement command to the motor controller 30 to move the jig 34 toward the object 2 (S1). Upon receiving the movement command, the motor controller 30 starts moving the jig 34 toward the object 2 (S2) and also starts acquiring operation data (S3). In S3, the motor controller 30 continuously acquires torque values and positions based on detection signals of the sensor 35, and records them as operation data on a time-series basis. After that, acquisition of torque values and positions is continued until the present processing is completed. When the motor controller 30 moves the jig 34 and fixing of the object 1 and the object 2 is completed (S4), the motor controller 30 transmits a fixing completion notification to the host controller 10 indicating that the fixing of the object 2 is completed (S5). The completion of the fixing of the object 1 and the object 2 may be determined by a torque value or the like, or there may be a sensor 35 that detects the completion of the fixing.

Upon receiving the fixing completion notification, the host controller 10 transmits a work start command to the robot controller 20 to start a welding work (S6). Upon receiving the work start command, the robot controller 20 causes the robot 24 to start the welding work (S7). The motor controller 30 controls the jig 34 such that the object 1 and the object 2 are fixed also during the welding work, and also continues to acquire operation data. Since the object 1 and the object 2 may expand during the welding operation, the motor controller 30 may control the jig 34 so as to suppress the expansion. When the welding work is completed, the robot controller 20 transmits a work completion notification to the host controller 10 indicating that the welding work has been completed (S8).

Upon receiving the work completion notification, the host controller 10 transmits a movement command to the motor controller 30 to move the jig 34 in a direction away from the object 2 (S9). Upon receiving the movement command, the motor controller 30 starts moving the jig 34 in this direction (S10). The motor controller 30 also continues to acquire operation data. When the jig 34 reaches the origin position (P0), the motor controller 30 transmits a movement completion notification to the host controller 10 indicating that the jig 34 has reached the origin position (P0) (S11). Upon receiving the movement completion notification, the host controller 10 waits for a next object 2 to be set.

The motor controller 30 estimates an abnormality based on the operation data (S12). In S12, various kinds of abnormality estimation as described above are possible. When an abnormality is estimated, the motor controller 30 outputs a predetermined alert and ends the present processing. It is also possible that, when an abnormality is estimated, a welding work with respect to a next object is not performed. When no abnormality is estimated, the present processing ends without an alert being output, and when a next object 2 is set, processing is executed again from the processing of S1. Abnormality estimation based on operation data does not need to be executed every cycle, and operation data of multiple cycles may be collectively analyzed.

According to the abnormality estimation system (S) of the present embodiment, by estimating an abnormality based on operation data measured at multiple time points after the object 2 is pressed by the jig 34, measurement results at multiple time points after the object 2 is pressed can be used. Therefore, abnormality estimation accuracy of the abnormality estimation system (S) is improved. For example, by using a measurement result during a work with respect to an object, an abnormality occurring during the work can be estimated. For example, by using a measurement result when the object 2 separates from the jig 34, information such as the width of the object can be more accurately estimated. Therefore, an abnormality that has occurred in the object 2 can be accurately estimated.

Further, the abnormality estimation system (S) estimates an abnormality based on the operation data measured at the time point (T5) when the jig 34 separates from the object 2, and thereby can use the measurement result at the time point (T5) when the jig 34 separates from the object 2. Therefore, abnormality estimation accuracy of the abnormality estimation system (S) is improved. For example, based on the measurement result at the time point (T5) when the jig 34 separates from the object 2, an abnormality can be estimated by accurately identifying information such as the width of the object.

Further, the abnormality estimation system (S) estimates an abnormality based on operation data including measurement results at a first time point when a first event occurs and a second time point when a second event occurs, and thereby can use measurement results at time points when events that are important for abnormality estimation occur. Therefore, abnormality estimation accuracy of the abnormality estimation system (S) is improved. For example, when measurement results at time points that are not so important for abnormality estimation are not used in abnormality estimation, noisy information is reduced, and thus, abnormality estimation accuracy is improved. When measurement results at time points that are not so important for abnormality estimation are not acquired, information that is not important is not measured, and thus, a processing load of the abnormality estimation system (S) is reduced.

Further, the abnormality estimation system (S) estimates an abnormality based on operation data including measurement results at the first time point (T2) when the jig 34 touches the object 2 and a second time point (T5) when the jig 34 separates from the object 2, and thereby can use measurement results at time points when events that are particularly important for abnormality estimation occur. Therefore, abnormality estimation accuracy of the abnormality estimation system (S) is improved. For example, when measurement results at time points that are not so important for abnormality estimation are not used in abnormality estimation, noisy information is reduced, and thus, abnormality estimation accuracy is improved. When measurement results at time points that are not so important for abnormality estimation are not acquired, information that is not important is not measured, and thus, a processing load of the abnormality estimation system (S) is reduced.

Further, the abnormality estimation system (S) estimates an abnormality based on operation data indicating the position (P1) at which the jig 34 touches the object 2 and the position (P2) at which the jig 34 separates from the object 2. As a result, abnormality estimation accuracy of the abnormality estimation system (S) is improved. For example, based on these positions, an abnormality in the width of the object 2 can be estimated.

Further, the abnormality estimation system (S) estimates an abnormality based on normal data related to a normal operation of the motor controller 30. As a result, abnormality estimation accuracy of the abnormality estimation system (S) is improved. Since an abnormality can be estimated by simpler processing, the processing load of the abnormality estimation system (S) is reduced.

Further, the abnormality estimation system (S) improves estimation accuracy of an abnormality occurring in an object. For example, quality of an object can be evaluated.

Further, the abnormality estimation system (S) can estimate an abnormality related to a width of an object. For example, expansion or compression caused by a work with respect to an object can be estimated.

Further, the abnormality estimation system (S) uses torque data. As a result, abnormality estimation accuracy of the abnormality estimation system (S) is improved.

Further, the abnormality estimation system (S) estimates an abnormality based on multiple kinds of operation data, and thereby, can comprehensively consider multiple kinds of operation data. Therefore, abnormality estimation accuracy of the abnormality estimation system (S) is improved.

Modified Embodiments

The present disclosure is not limited to the embodiment described above. Appropriate modifications are possible within a scope without departing from the spirit of the present disclosure.

Figure 6:
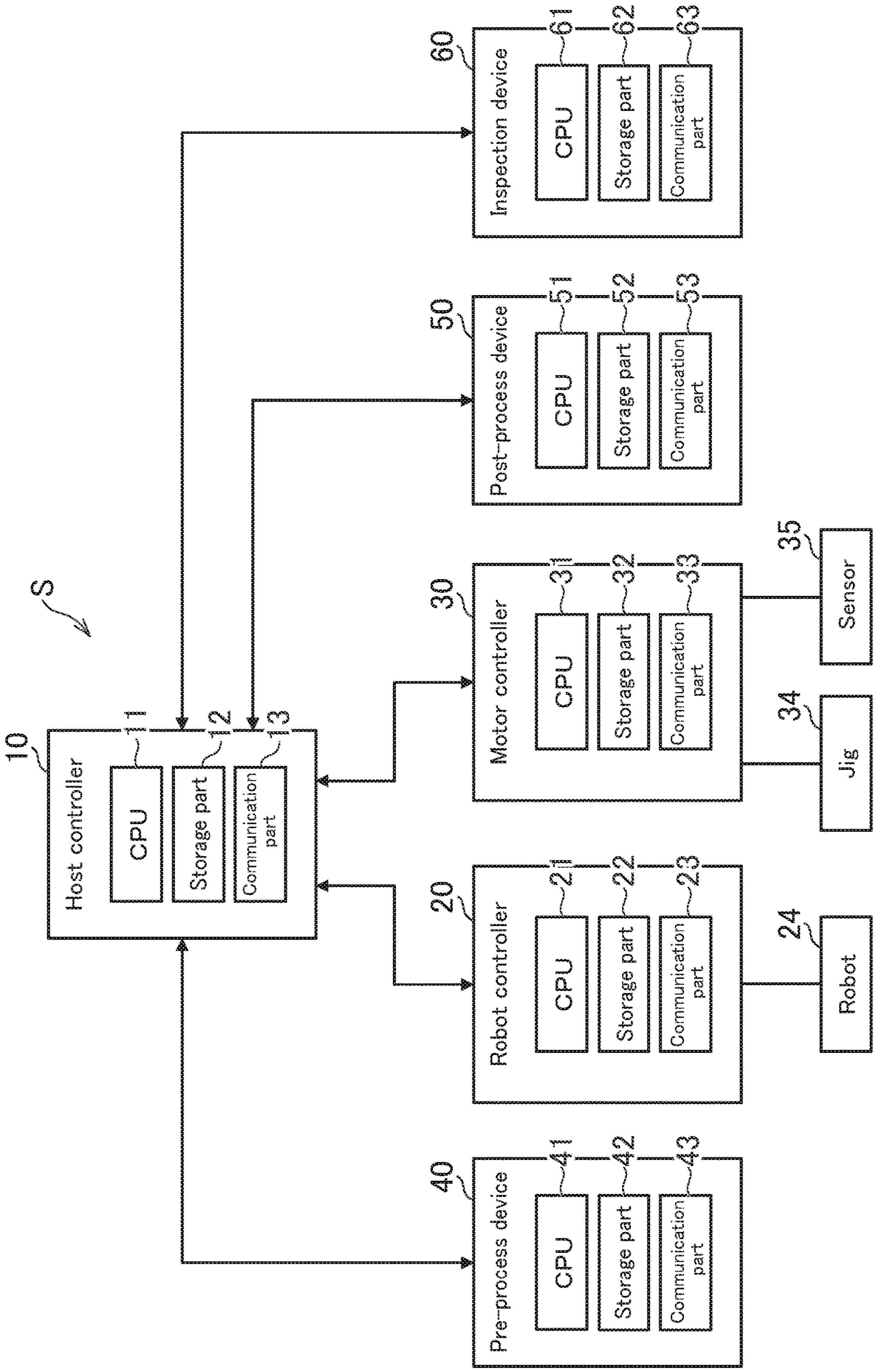
FIG. 6 illustrates an example of an overall structure of an abnormality estimation system according to modified embodiments of the present invention.

FIG. 6 illustrates an example of an overall structure of an abnormality estimation system (S) of modified embodiments. In the modified embodiments, a pre-process device 40 to be described in a second modified embodiment, a post-process device 50 to be described in a third modified embodiment, and an inspection device 60 to be described in a fifth modified embodiment are connected to the host controller 10. Physical structures of CPUs (41, 51, 61), storage parts (42, 52, 62), and communication parts (43, 53, 63) may be respectively the same as those of the CPU 11, the storage part 12, and the communication part 13.

Figure 7:
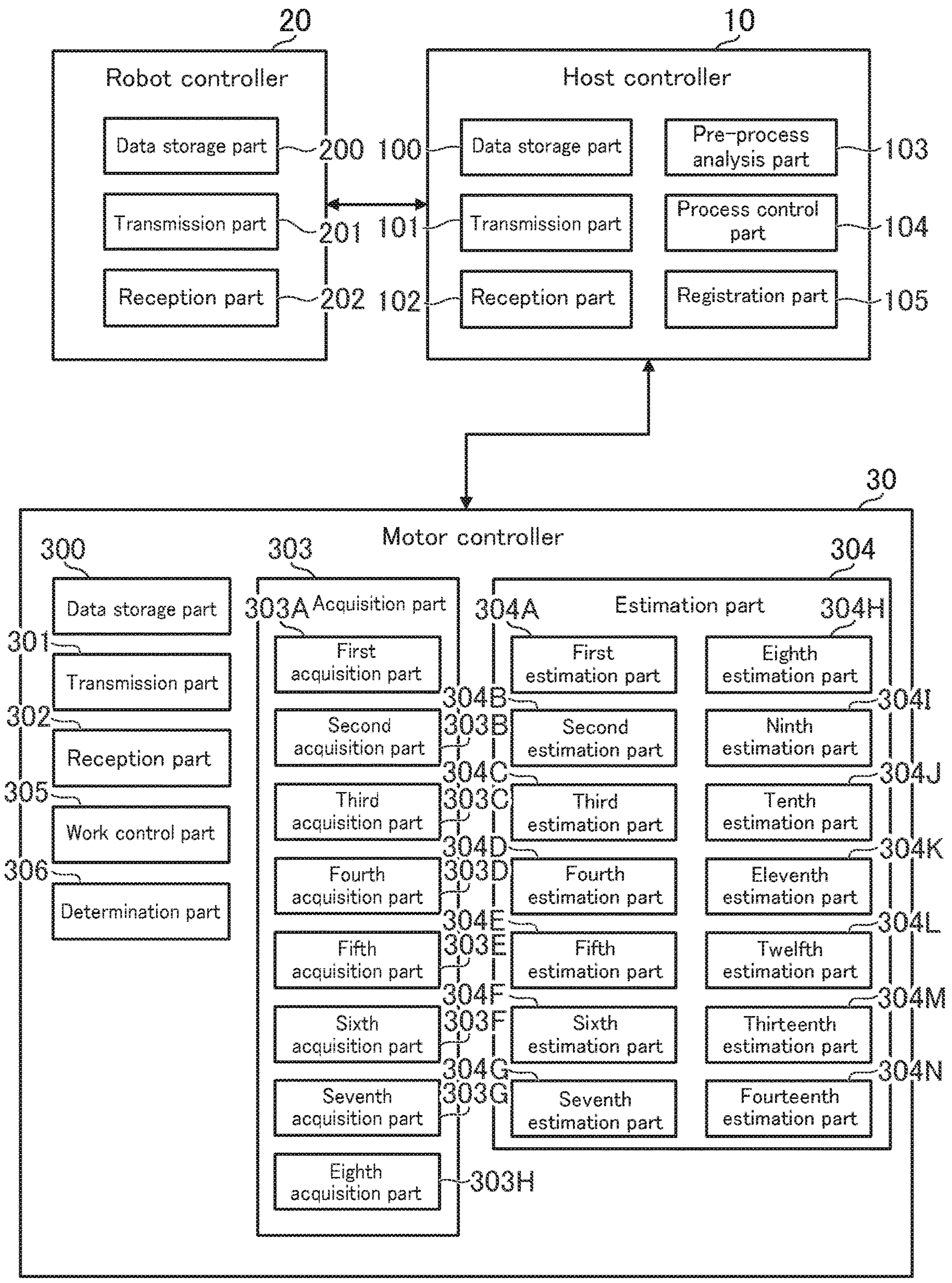
FIG. 7 illustrates an example of functional blocks according to the modified embodiments of the present invention.

FIG. 7 illustrates an example of functional blocks of the modified embodiments. In the modified embodiments, the acquisition part 303 includes the fifth acquisition part (303E) and the sixth acquisition part (303F). The estimation part 304 includes the eighth estimation part (304H)—the twelfth estimation part (304L) A pre-process analysis part 103, a process control part 104, and a registration part 105 are mainly realized by the CPU 11. A work control part 305 and a determination part 306 are mainly realized by the CPU 31.

First Modified Embodiment

For example, in the abnormality estimation system (S), an abnormality estimation target is not limited to an object. An abnormality in a predetermined device related to a welding work may be estimated. The predetermined device is a device that is involved in a welding work. In the first modified embodiment, a case where the motor controller 30 corresponds to the predetermined device is described. Therefore, in the first modified embodiment, a part described as the motor controller 30 can be read as the predetermined device.

The abnormality estimation system (S) of the first modified embodiment includes the eighth estimation part (304H) that estimates an abnormality related to the motor controller 30 based on the operation data acquired by the acquisition part 303. The eighth estimation part (304H) may estimate an abnormality in internal processing executed by the motor controller 30, or may estimate an abnormality in the jig 34 controlled by the motor controller 30.

For example, the eighth estimation part (304H) does not estimate that an abnormality has occurred in a case where a deviation between the operation data acquired by the acquisition part 303 and normal data when the motor controller 30 normally operates is less than a threshold, and estimates that an abnormality has occurred in a case where this deviation is equal to or larger than the threshold. The eighth estimation part (304H) may estimate the kind of the abnormality based on at least one of a magnitude and timing of the deviation between the operation data and the normal data. In this case, a relationship between at least one of the magnitude and timing of the deviation and the kind of the abnormality is stored in advance in the data storage part 300. The eighth estimation part (304H) estimates that the abnormality of the kind associated with the deviation between the operation data and the normal data has occurred.

Similar to the estimation part 304 described in the embodiment, a method for estimating an abnormality by the eighth estimation part (304H) is not limited to a method using the normal data. For example, the eighth estimation part (304H) may estimate an abnormality related to the motor controller 30 based on an analytical method. The eighth estimation part (304H) estimates an abnormality related to the motor controller 30 based on an amount of change in a value indicated by operation data. For example, the eighth estimation part (304H) estimates that an abnormality has occurred in the motor controller 30 in a case where there are a predetermined number or more of time points when the amount of change is equal to or greater than a threshold.

In addition, for example, the eighth estimation part (304H) may estimate an abnormality related to the motor controller 30 based on a machine learning method. In this case, training data showing a relationship between operation data acquired for training and information about an abnormality (for example, at least one of the presence or absence and the type of an abnormality) of the motor controller 30 is learned in a learning model. The eighth estimation part (304H) may input operation data to the training model and acquire an abnormality estimation result of the motor controller 30 output from the training model.

The predetermined device as an abnormality estimation target in the first modified embodiment may be any device, and is not limited to the motor controller 30. For example, the predetermined device may be the host controller 10, the robot controller 20, the robot 24, the jig 34, or the sensor 35. In addition, for example, the predetermined device may be a device that performs a process before a welding work, or may be a device that performs a process after a welding work. For example, the eighth estimation part (304H) may estimate a degree of deterioration of at least one of the jig clamp (34A) and the fixed-side member (34B) as an abnormality of the jig 34.

According to the first modified embodiment, estimation accuracy of an abnormality related to a predetermined device such as the motor controller 30 related to a work with respect to an object is improved. For example, an abnormality that suddenly occurs in a predetermined device such as the motor controller 30 or an abnormality due to aging can be estimated.

Second Modified Embodiment

For example, data obtained in a pre-process of a welding work may be analyzed based on an abnormality estimation result by the estimation part 304. The abnormality estimation system (S) of the second modified embodiment includes the pre-process analysis part 103 that analyzes pre-process data related to a pre-process of a welding work based on an abnormality estimation result. The pre-process is a process performed before a welding work. The pre-process may be one process before a welding work, or may be two or more processes before a welding work.

In the second modified embodiment, the object 1 and the object 2 are painted before a welding work. Therefore, the painting process corresponds to a pre-process. A pre-process may be any process and is not limited to a painting process. For example, when an assembly process of the object 1 and the object 2 is performed before the painting process, the assembly process is also performed before a welding work, and thus, also corresponds to a pre-process. In addition, for example, a process such as a carrying process, a measurement process, or an inspection process may correspond to a pre-process.

Pre-process data is operation data of a pre-process. In the second modified embodiment, since the pre-process is a painting process, operation data of the painting process corresponds to the pre-process data. Meaning of the term "operation data" is as described in the embodiment. For example, the pre-process data may be torque data based on a torque sensor connected to the pre-process device 40.

The pre-process data is acquired by the pre-process device 40. The pre-process device 40 is a device that performs the pre-process. In the second modified embodiment, since the pre-process is a painting process, a case is described where a robot controller that controls a painting robot corresponds to the pre-process device 40. The pre-process device 40 may be any device, for example, may be a motor controller or a numerical control device.

When an abnormality has been estimated by the estimation part 304, the pre-process analysis part 103 analyzes the pre-process data and determines whether or not a cause of the abnormality in the welding process is the pre-process. For example, the pre-process analysis part 103 determines that the cause of the abnormality in the welding process is not the pre-process in a case where a deviation between the pre-process data and normal data when the pre-process is normally performed is less than a threshold, and determines that the cause of the abnormality in the welding process is the pre-process when this deviation is equal to or larger than the threshold.

A method for analyzing the pre-process data may be any method and is not limited to the method using the normal data. For example, the pre-process analysis part 103 may analyze the pre-process data based on an analytical method. The pre-process analysis part 103 may determine whether or not the cause of the abnormality in the welding process is the pre-process based on an amount of change in a value indicated by the pre-process data. For example, the pre-process analysis part 103 determines that the cause of the abnormality in the welding process is the pre-process in a case where there are a predetermined number or more of time points when the amount of change is equal to or greater than a threshold.

For example, the pre-process analysis part 103 may analyze the pre-process data based on a machine learning method. In this case, training data showing a relationship between pre-process data acquired for training and information indicating whether or not the cause of the abnormality in the welding process is the pre-process is learned in a learning model. The pre-process analysis part 103 may input pre-process data into the learning model and acquire a determination result about the cause of the abnormality output from the learning model.

According to the second modified embodiment, by analyzing pre-process data related to a pre-process of a work based on an abnormality estimation result, abnormality estimation accuracy is improved. For example, since a cause of an abnormality may be a pre-process, the cause of the abnormality can be accurately estimated.

Third Modified Embodiment

For example, an abnormality estimation result by the estimation part 304 may be used to control at least one of a pre-process and a post-process of a welding work. The abnormality estimation system (S) of the third modified embodiment includes the process control part 104 that controls at least one of a pre-process and a post-process of a work based on an abnormality estimation result. The post-process is a process performed after a welding work. The post-process may be one process after a welding work, or may be two or more processes after a welding work.

In the third modified embodiment, after a welding work, the object 1 and the object 2, which have been joined to each other, and other objects are assembled. Therefore, the assembly process corresponds to a post-process. A post-process may be any process and is not limited to an assembly process. For example, after an assembly process, when an inspection process of an object after the assembly is performed, the inspection process is also performed after the welding work, and thus, also corresponds to a post-process. In addition, for example, a process such as a carrying process, a measurement process, or an inspection process may correspond to a post-process.

In the third modified embodiment, a case is described where the process control part 104 controls both a pre-process and a post-process. However, it is also possible that the process control part 104 controls only one of a pre-process and a post-process. Further, in the third modified embodiment, the process control part 104 is realized by the host controller 10, and the estimation part 304 is realized by the motor controller 30. Therefore, the host controller 10 acquires an estimation result of the estimation part 304 from the motor controller 30.

For example, when an abnormality in a certain object has been estimated, the process control part 104 controls a pre-process such that the abnormality does not occur in the pre-process with respect to a next object. For example, when it is estimated that a cause of for an abnormality occurring in a welding work is excessive painting in a painting process, which is a pre-process, the process control part 104 controls the pre-process such that a painting time in the painting process is reduced. In addition, for example, the process control part 104 controls the pre-process such that an amount of paint used in the painting process is reduced. For example, when an abnormality in a certain object has been estimated, the process control part 104 controls a post-process so as to cancel the abnormality that has occurred in the object. For example, when an abnormality has occurred in a width of an object during a welding work, in an assembly process, which is a post-process, the process control part 104 controls the post-process such that this object is assembled with another object having a size suitable for this width.

According to the third modified embodiment, by controlling at least one of a pre-process and a post-process based on an abnormality estimation result, accuracy of the at least one of the pre-process and the post-process is improved. For example, when an abnormality has occurred in a certain object, by controlling a pre-process such that the abnormality does not occur in a next object, quality of the next object is improved. For example, even when an abnormality has occurred, by controlling a post-process to cancel the abnormality, quality of an object is improved.

Fourth Modified Embodiment

For example, in the third modified embodiment, a case is described where an abnormality estimation result by the estimation part 304 is used to control at least one of a pre-process and a post-process of a welding work. However, the estimation result may be used to control a welding work being executed, or may be used in a next and subsequent welding work. The abnormality estimation system (S) of the fourth modified embodiment includes the work control part 305 that controls a work based on an abnormality estimation result.

For example, when an abnormality has been estimated during a welding work of a certain object, the work control part 305 controls the welding work being executed so as to cancel the abnormality that has occurred in the object. For example, when an abnormality occurs in a width of an object during a welding work being executed, a welding temperature is controlled such that the object does not expand too much during the welding work being executed. For example, when an abnormality has been estimated during a welding operation of a certain object, the work control part 305 may control a next welding work such that the abnormality does not occur in a welding work for a next object. For example, when an abnormality has occurred in a width of an object for which a welding work has been completed, a next welding work may be controlled such that an object does not expand too much and a width of a welding is reduced.

According to the fourth modified embodiment, by controlling a work with respect to an object based on an abnormality estimation result, quality of the object is improved. For example, even when an abnormality has occurred during a work being executed with respect to an object, by performing a work that cancels the abnormality, quality of the object is improved.

Fifth Modified Embodiment

For example, it may be difficult to manually determine suitability of a parameter used in abnormality estimation. Therefore, machine learning may be used to determine the suitability of the parameter. A parameter is a threshold in abnormality estimation using normal data, a threshold in an analytical method, or a coefficient of a learning model in a machine learning method. The abnormality estimation system (S) of the fifth modified embodiment includes a determination part 306 that determines a parameter used in abnormality estimation based on a learning model in which abnormality estimation results executed in the past and inspection results of objects for which welding works have been performed in the past are learned.

Inspection of an object for which a welding work has been performed is performed by the inspection device 60. The inspection device 60 can execute any inspection, and inspects, for example, a size, a shape, an intensity, a shade, or a combination of these. The inspection device 60 transmits an inspection result to the host controller 10. An inspection result may include not only presence or absence of an abnormality, but also information such as how far it is from a normal value, or how close it is to an upper limit value for being determined as normal.

In a learning model, training data including abnormality estimation results executed for training and inspection results of objects for training is learned. This learning model is not a learning model for estimating an abnormality, but a model for determining suitability of a parameter used in abnormality estimation. For example, the learning model may output an inspection result when an abnormality estimation result is input. In this case, whether or not a current estimation result is correct can be estimated by the learning model without performing an actual inspection by the inspection device 60.

When an abnormality estimation result is not estimated to be correct, it can be determined that a parameter needs to be changed. In this case, the determination part 306 may change a current parameter by a predetermined value. For example, the determination part 306 may determine a parameter according to current operation data by using a learning model that automatically determines a parameter. For example, the determination part 306 may determine an amount of change in a parameter according to a rate at which an abnormality estimation result is incorrect.

The abnormality estimation system (S) of the fifth modified embodiment includes the ninth estimation part (304I) that estimates an abnormality based on a parameter determined by the determination part 306. The ninth estimation part (304I) replaces a parameter used in abnormality estimation with a parameter determined by the determination part 306. Although it differs from the embodiment in that a parameter is replaced, the abnormality estimation method itself is as described in the embodiment.

According to the fifth modified embodiment, by determining a parameter used in abnormality estimation based on a learning model in which abnormality estimation results executed in the past and inspection results of objects for which works have been performed in the past are learned, abnormality estimation accuracy is improved. For example, it is difficult for a user to determine suitability of a threshold, which is an example of a parameter used in abnormality estimation. In this regard, by estimating suitability of a parameter using a learning model, an appropriate threshold in abnormality estimation can be set.

Sixth Modified Embodiment

For example, the object 2 may be pressed by multiple jigs 34. In the sixth modified embodiment, a case is described where, for each jig 34, a motor controller 30 controlling the each jig 34 is prepared. However, it is also possible that one motor controller 30 controls multiple jigs 34. The motor controllers 30 may each have the same structure as that of the motor controller 30 described in the embodiment.

The abnormality estimation system (S) of the sixth modified embodiment includes the fifth acquisition part (303E) that acquires operation data sets respectively corresponding to the multiple jigs 34. The operation data sets each have a similar content to that of the operation data described in the embodiment. In the sixth modified embodiment, the fifth acquisition part (303E) respectively acquires operation data sets from the multiple motor controllers 30 that respectively correspond to the multiple jigs 34.

The abnormality estimation system (S) of the sixth modified embodiment includes the tenth estimation part (304J) that estimates an abnormality based on the operation data sets acquired by the fifth acquisition part (303E). The tenth estimation part (304J) estimates an abnormality by comprehensively considering the multiple operation data sets that respectively correspond to the multiple jigs 34. For example, the tenth estimation part (304J) may estimate an abnormality based on each operation data set similar to the embodiment, and may finally estimate that an abnormality has occurred when a predetermined number or more of the jigs 34 have been estimated to have an abnormality.

In addition, for example, an abnormality is estimated in an operation data set corresponding to a certain jig 34, but an operation data set corresponding to another jig 34 has a tendency to cancel the abnormality. In this case, it is possible that the tenth estimation part (304J) does not estimate that an abnormality has occurred. More specifically, based on an operation data set corresponding to a certain jig, a thickness exceeding a normal range has occurred at a predetermined part of the object 2, but there is a recess at another part of the object 2 that cancels this thickness. In this case, it is possible that the tenth estimation part (304J) does not estimate that an abnormality has occurred.

In the sixth modified embodiment, a case is described where the multiple jigs 34 press the object 2 at the same time. However, it is also possible that the multiple jigs 34 alternately press the object 2. Also in this case, the tenth estimation part (304J) may estimate an abnormality based on operation data sets that respectively correspond to the jigs 34.

According to the sixth modified embodiment, an abnormality is estimated based on operation data sets that respectively correspond to the multiple jigs 34, and thereby, an abnormality can be estimated by comprehensively considering states of the multiple jigs 34. Therefore, abnormality estimation accuracy of the abnormality estimation system (S) is improved. For example, even when an abnormality has occurred in one certain jig 34, it can be normal when an estimation result that cancels this abnormality is obtained from another jig 34.

Seventh Modified Embodiment

For example, an abnormality may be estimated by comprehensively considering operation data sets of respective multiple objects instead of one certain object. The abnormality estimation system (S) of the seventh modified embodiment includes the sixth acquisition part (303F) that acquires operation data sets that respectively correspond to multiple objects. The operation data sets each have a content as described in the embodiment. For example, the sixth acquisition part (303F) acquires operation data sets one after another each time a welding work is performed with respect to an object, such as, when a welding work is performed with respect to a certain object, acquires an operation data set corresponding to this object, and when a welding work is performed with respect to a next object, acquires an operation data set corresponding to the next object.

The abnormality estimation system (S) of the seventh modified embodiment includes the eleventh estimation part (304K) that estimates an abnormality based on operation data acquired by the sixth acquisition part (303F). For example, the eleventh estimation part (304K) estimates an abnormality based on a time-series change in operation data sets of multiple objects. The eleventh estimation part (304K) estimates that an abnormality has occurred when an abnormality has occurred in an operation data set corresponding to a certain object and operation data sets corresponding to objects before and after the certain object is in a normal range. The eleventh estimation part (304K) estimates that an abnormality has occurred in a predetermined device such as the motor controller 30 or the jig 34 when an abnormality has occurred in an operation data set corresponding to a certain object and operation data sets corresponding to objects before the certain object have gradually approached an abnormality.

According to the seventh modified embodiment, an abnormality is estimated based on operation data sets that respectively correspond to multiple objects, and thereby, for example, states of the multiple objects can be comprehensively considered. Therefore, abnormality estimation accuracy of the abnormality estimation system (S) is improved. For example, a cause of an abnormality can be estimated based on whether or not the operation data has suddenly become abnormal or the operation data has gradually approached an abnormality. For example, even when an abnormality has occurred in one certain object, it can be normal when an estimation result that cancels this abnormality is obtained from another object.

Eighth Modified Embodiment

For example, the abnormality estimation system (S) of the eighth modified embodiment may have the registration part 105 that registers object identification information, which can identify an object, and an abnormality estimation result in association with each other in a database. The object identification information is information that can uniquely identify an object produced in a certain period. For example, the object identification information is an object ID assigned to an object. When an object is a final product, a product serial number corresponds to the object identification information. The abnormality estimation result associated with the object identification information may be not only presence or absence of an abnormality but also a probability indicating a suspicion of an abnormality. The database in which the object identification information and the abnormality estimation result are associated with each other is stored in the data storage part 100.

According to the eighth modified embodiment, traceability of an object can be ensured by registering the object identification information, which can identify the object, and the abnormality estimation result in association with each other in the database.

Ninth Modified Embodiment

For example, the abnormality estimation system (S) of the ninth modified embodiment may have the twelfth estimation part (304L) that estimates a change in cycle time as an abnormality. The cycle time is time required for a work that is periodically performed. For example, the twelfth estimation part (304L) determines whether or not a cycle time required for a welding work is within a normal range. When a welding work is performed according to the flow illustrated in FIG. 2 in a certain cycle, the cycle time may be a period from the time point (T1) when the jig clamp (34A) starts moving to the time point (T6) when the jig clamp (34A) returns to the origin position (P0). The cycle time is not limited to the period from the time point (T1) to the time point (T6), and may be a period between multiple time points in which some event can be detected from operation data. For example, the cycle time may be from the time point (T2) to the time point (T5).

According to the ninth modified embodiment, estimation accuracy of a change in cycle time is improved.

Other Modified Embodiments

For example, the above-described modified embodiments may be combined.

For example, the functions described above may each be realized by any device in the abnormality estimation system (S). The functions described as being included in the host controller 10 may be realized by the robot controller 20 or the motor controller 30. The functions described as being included in the robot controller 20 may be realized by the host controller 10 or the motor controller 30.

The functions described as being included in the motor controller 30 may be realized by the host controller 10 or the robot controller 20. The host controller 10 may estimate an abnormality by acquiring operation data of the motor controller 20. That is, the acquisition part 303 and the estimation part 304 may be realized by the host controller 10. Functions described as being realized by one device may be shared by multiple devices.

An abnormality estimation system according to an embodiment of the present invention includes: an industrial device that controls at least one jig for pressing an object as an object of a work; an acquisition part that acquires operation data that is related to an operation of the industrial device and is measured at multiple time points after the object is pressed by the at least one jig; and an estimation part that estimates an abnormality based on the operation data acquired by the acquisition part.

According to an embodiment of the present invention, for example, abnormality estimation accuracy is improved.

Obviously, numerous modifications and variations of the present invention are possible in light of the above teachings. It is therefore to be understood that within the scope of the appended claims, the invention may be practiced otherwise than as specifically described herein.

What is claimed is:

1. A system for estimating an abnormality, comprising:

an industrial device configured to control at least one jig such that the at least one jig presses an object to perform a work process;

a torque data acquisition sensor configured to acquire torque data of torque of a motor configured to move the jig;

a position data acquisition sensor configured to acquire position data on a position of the jig; and processing circuitry configured to detect that the jig is separated from the object based on the torque data and perform an estimation estimating an abnormality based on the position data, the position data being acquired based on detection that the jig is separated from the object, wherein the torque data includes a torque measurement at a time point when the jig starts to separate from the object, wherein the processing circuitry is configured to estimate the abnormality based on the torque measurement.

2. The system according to claim 1, wherein the processing circuitry is further configured to detect a second time point when the jig starts to contact the object based on the torque data and to perform the estimation further estimating the abnormality based on the position data corresponding to the second time point.

3. The system according to claim 1, wherein the processing circuitry is configured to perform a second acquisition process that acquires the torque data or position data including measurement results at a first time point when a first event occurs and a second time point when a second event occurs, and perform a second estimation process that estimates the abnormality based on the torque data or position data acquired by the second acquisition process.

4. The system according to claim 3, wherein the processing circuitry is configured to perform a third acquisition process that acquires the torque data including measurement results at the first time point when the first event, in which the at least one jig touches the object, occurs and at the second time point when the second event, in which the at least one jig separates from the object, occurs, and perform a third estimation process that estimates the abnormality based on the torque data acquired by the third acquisition process.

5. The system according to claim 4, wherein the processing circuitry is configured to perform a fourth acquisition process that acquires the position data indicating a position at which the at least one jig touches the object and a position at which the at least one jig separates from the object, and perform a fourth estimation process that estimates the abnormality based on the position data acquired by the fourth acquisition process.

6. The system according to claim 1, wherein the processing circuitry is configured to perform a fifth estimation process that estimates the abnormality based on normal data related to a normal operation of the industrial device.

7. The system according to claim 1, wherein the processing circuitry is configured to perform a sixth estimation process that estimates an abnormality that has occurred in the object based on the position data acquired.

8. The system according to claim 7, wherein the processing circuitry is configured to perform a seventh estimation process that estimates the abnormality related to a width of the object as an abnormality that has occurred in the object.

9. The system according to claim 1, wherein the processing circuitry is configured to perform an eighth estimation process that estimates an abnormality related to a predetermined device that is associated with the work process, based on the position data.

10. The system according to claim 1, wherein the processing circuitry is configured to analyze pre-process data related to a pre-process performed prior to the work process, based on an abnormality estimation result.

11. The system according to claim 1, wherein the processing circuitry is configured to control at least one of a pre-process, which is performed prior to the work process, and a post-process, which is performed after the work process, based on an abnormality estimation result.

12. The system according to claim 1, wherein the processing circuitry is configured to determine a parameter used in estimation of the abnormality based on a learning model in which an estimation result of the abnormality executed in a past and an inspection result of an object for which the work process has been performed in the past are learned; and perform a ninth estimation process that estimates the abnormality based on the parameter.

13. The system according to claim 1, wherein the at least one jig comprises multiple jigs and the object is pressed by the multiple jigs, and the processing circuitry is configured to perform a fifth acquisition process that acquires torque data and position data sets that respectively correspond to the multiple jigs, and perform a tenth estimation process that estimates the abnormality based on the torque data and position data sets acquired by the fifth acquisition process.

14. The system according to claim 1, wherein the processing circuitry is configured to perform a sixth acquisition process that acquires torque data and position data sets that respectively correspond to multiple objects, and perform an eleventh estimation process that estimates the abnormality based on the torque data and position data sets acquired by the sixth acquisition process.

15. The system according to claim 1, wherein the processing circuitry is configured to register object identification information, which identifies the object, and an estimation result of the abnormality in association with each other in a database.

16. The system according to claim 1, wherein the processing circuitry is configured to perform a twelfth estimation process that estimates a change in cycle time as the abnormality.

17. The system according to claim 1, wherein the processing circuitry is configured to perform a seventh acquisition process that acquires torque data and position data, and perform a thirteenth estimation process that estimates the abnormality based on the torque data and position data acquired by the seventh acquisition process.

18. A method for estimating abnormality, comprising:
controlling a jig by an industrial device such that the jig presses an object to perform a work process;
acquiring torque data of torque of a motor configured to move the jig using a torque data acquisition sensor;
acquiring position data on a position of the jig using a position data acquisition sensor;
detecting that the jig is separated from the object based on the torque data; and
estimating an abnormality based on the position data, the position data being acquired based on detection that the jig is separated from the object,
wherein the torque data includes a torque measurement at a time point when the jig starts to separate from the object, wherein the estimating includes estimating the abnormality based on the torque measurement.

19. A non-transitory computer-readable storage medium including computer executable instructions, wherein the instructions, when executed by a computer, cause the computer to perform a method, the method comprising:
controlling a jig by an industrial device such that the jig presses an object to perform work process;
acquiring torque data of torque of a motor configured to move the jig using a torque data acquisition sensor;
acquiring position data on a position of the jig using a position data acquisition sensor;
detecting that the jig is separated from the object based on the torque data; and
estimating an abnormality based on the position data, the position data being acquired based on detection that the jig is separated from the object,
wherein the torque data includes a torque measurement at a time point when the jig starts to separate from the object, wherein the estimating includes estimating the abnormality based on the torque measurement.

20. The system according to claim 1, wherein the torque data includes a first torque measurement at a first time point when the jig starts to contact the object, and a second torque measurement at a second time point, being the time point, when the jig starts to separate from the object, wherein the processing circuitry is configured to estimate the abnormality based on the first and second torque measurements.

* * * * *